G. H. REYNOLDS.
UPSETTING MACHINE.
APPLICATION FILED FEB. 2, 1907.

989,805.

Patented Apr. 18, 1911.

WITNESSES:

INVENTOR
George H. Reynolds
BY
E. W. Marshall
ATTORNEY

UNITED STATES PATENT OFFICE.

GEORGE H. REYNOLDS, OF MANSFIELD DEPOT, CONNECTICUT, ASSIGNOR TO GENERAL FIRE EXTINGUISHER COMPANY, A CORPORATION OF NEW YORK.

UPSETTING-MACHINE.

989,805.  Specification of Letters Patent.  Patented Apr. 18, 1911.

Application filed February 2, 1907. Serial No. 355,421.

*To all whom it may concern:*

Be it known that I, GEORGE H. REYNOLDS, a citizen of the United States, and a resident of Mansfield Depot, in the county of Tolland and State of Connecticut, United States of America, have invented certain new and useful Improvements in Upsetting-Machines, of which the following is a specification.

My invention relates to an apparatus for upsetting malleable metals and is especially adaptable for upsetting the ends of malleable pipes and consists in the novel construction and arrangement of parts herein set forth, the novel features of which are specifically set forth in claims.

Referring to the drawings.

Like characters of reference designate corresponding parts in all of the figures.

Figure 1:
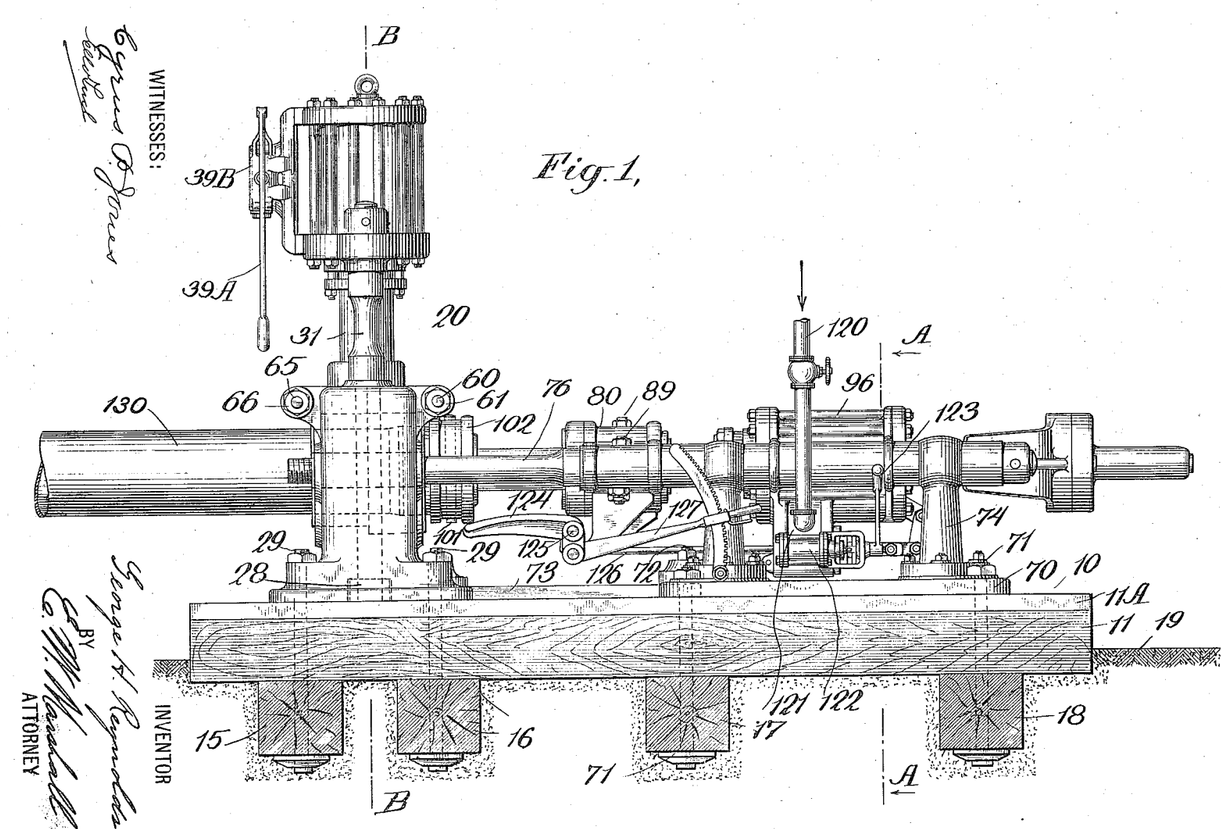
Figure 1 is a side elevation of a machine made according to my invention.
Figure 4:
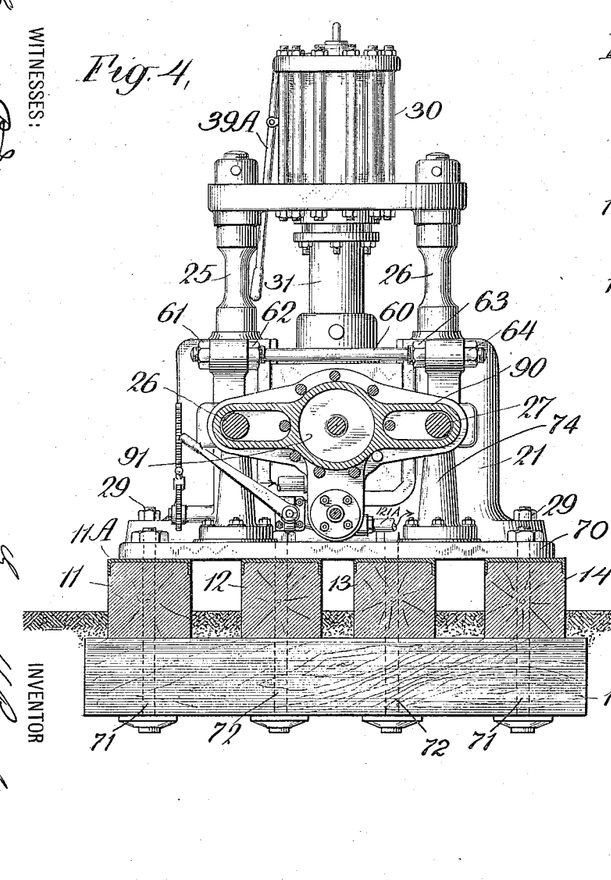
Fig. 4 is a sectional end elevation of this machine, the section being taken through the line A—A of Fig. 1.

10 designates a foundation upon which the apparatus is supported. This foundation, as shown, comprises longitudinal beams 11, 12, 13 and 14 which are capped as shown at 11^A with inverted channel-irons. These longitudinal beams rest upon a plurality of transverse beams 15, 16, 17 and 18 which are surrounded by a filling of cement or concrete 19. This filling, as is clearly shown in Figs. 1 and 4, is carried up to a level somewhat above that of the transverse beams and forms a floor about the apparatus.

Figures 2, 3:
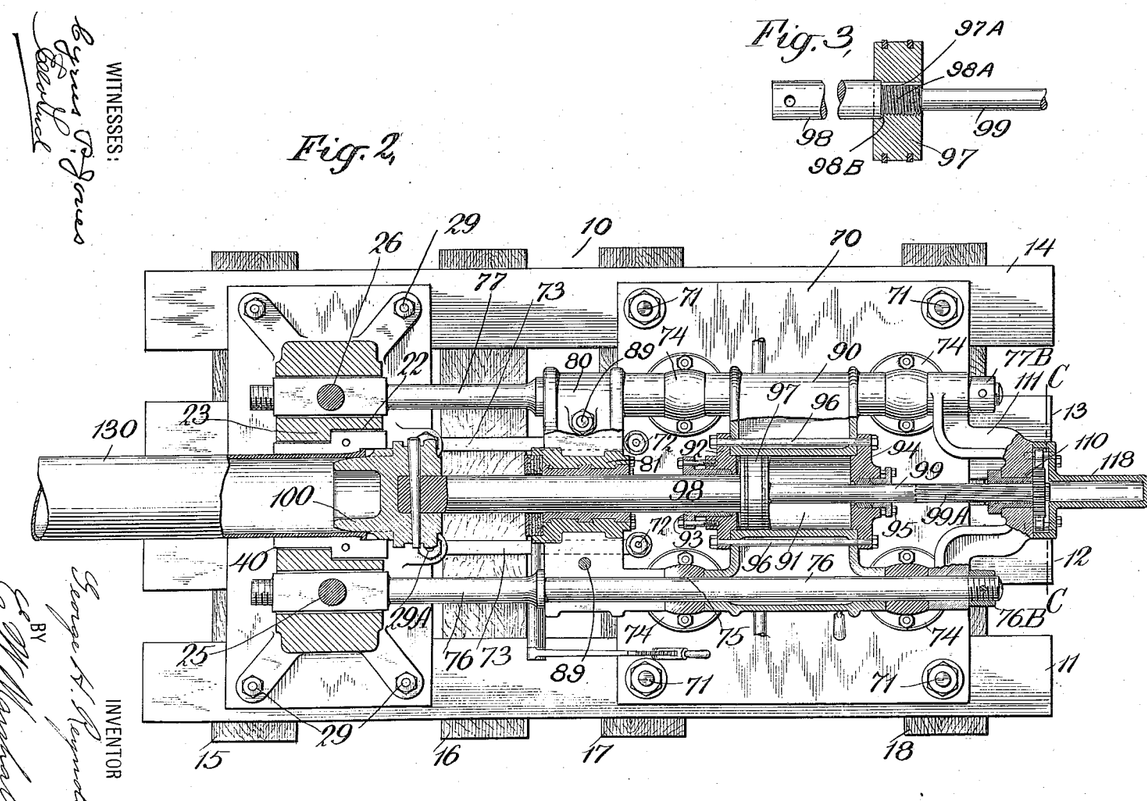
Fig. 2 is a top plan view, partly in section, of the same machine.
Fig. 3 shows in detail a construction which I use for attaching my steam-engine piston to its piston rod.
Figures 5, 6, 8, 9:
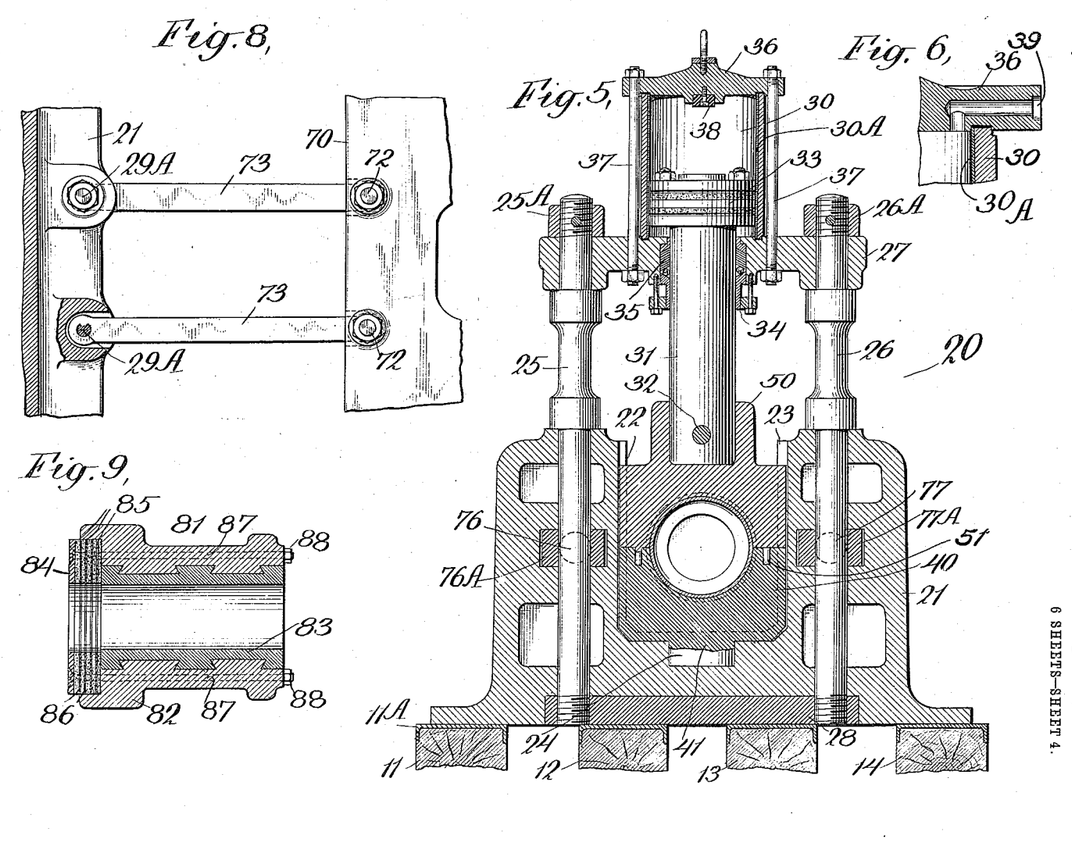
Fig. 5 is a sectional end elevation of the same, the section being taken through the line B—B of Fig. 1.
Fig. 6 is an enlarged sectional view of a detail of the hydraulic cylinder shown in section in Fig. 5.
Fig. 8 shows in detail an arrangement of holding-bars which I have devised for securing certain parts of my apparatus firmly together.
Fig. 9 is a sectional side elevation of a special hammer-buffer cushion which I use, this figure showing somewhat in detail the construction of the buffer.

20 designates a hammer-block and a die-clamping device. This block comprises a hammer-block 21 and a hydraulic cylinder 30. The hammer-block 21 is arranged, as is shown in Figs. 2 and 5, to form a frame or receptacle 22 with a shoulder 23 for the reception of a pair of die-blocks 40 and 50. The lower portion of the under die-block 40 is provided with a depending lug 41 which is adapted to fit into a recess 24 in the hammer-block 21. The upper die-block 50 is arranged to be secured to the lower end of a plunger 31 by means of a pin 32. The upper end of this plunger extends into the hydraulic cylinder 30 and is attached to a piston 33 which is within this cylinder. These parts may be integral if desired.

25 and 26 designate two vertical cylinder-supports which are arranged to pass through the hammer-block 21 and through two longitudinal tie-rods 76 and 77, and to hold the horizontal cylinder-supporting yoke 27.

29 designates foundation-bolts which are arranged to pass through a portion of the hammer-block frame and through the longitudinal and lateral beams of the foundation 10 in the manner shown. 29ᴬ, 29ᴬ designate two other foundation-bolts which are arranged to pass through the hammer-block into the foundation in the manner just described. These two foundation-bolts also pass through a pair of tie-bars 73, 73.

The yoke 27 is arranged to form the lower head of the cylinder 30. 34 designates a stuffing-box which is arranged in this portion 27 in a well-known manner and is arranged to hold packing 35 about the plunger 31.

30ᴬ designates a lining of copper or other suitable material within the cylinder 30.

The upper cylinder-head is designated by 36. This upper cylinder-head 36 is connected with the lower cylinder-head 27 by means of a series of tie-bolts 37, 37. A buffer-plug 38 may be attached to the central portion of the upper cylinder-head as shown in Fig. 5. This buffer-plug may be of fiber or other suitable material.

In Fig. 6 I have shown, somewhat in detail, the arrangement of the parts which form the cylinder 30 and the upper cylinder-head 36, and this figure also shows, at 39, the manner in which the water-ports are arranged through the upper cylinder-head. A similar arrangement for another port is provided in the yoke 27. 39ᴬ designates a manually operated lever which is arranged to actuate a valve 39ᴮ which controls these water-ports.

I will now describe the general form and construction of the die-blocks 40 and 50. These blocks are substantially alike in form. The inner surfaces of these blocks are of circular form and are constructed to hold between them the end of a pipe which is to be held thereby and the end of which is to be upset and flanged by a hammer until the end assumes a given shape which is determined by the form of the inner surfaces of these die-blocks and face of the hammer. The lower block 40 is provided, as shown in the drawings, with a depending circular lug 41 which is adapted to fit into a portion of the hammer-block frame for the purpose of preventing these blocks from moving longitudinally during the upsetting operation. The upper block 50 may be arranged with dowel pins 51 which are arranged to fit corresponding holes in the lower die-block. Both of these die-blocks are arranged with shoulders as shown at 42 and 52 which correspond with the shoulders 23 in the hammer-block frame.

130 designates a pipe, the end of which is to be upset and flanged. This pipe may be placed between the die-blocks 40 and 50, after which hydraulic or other pressure from a suitable source of supply may be admitted to the upper portion of the pressure-cylinder 30. By this arrangement the pipe may be securely held in the hammer-block between the two dies and firmly secured thereby during the operation of the apparatus. By admitting hydraulic pressure to the under surface of piston 33 the upper die-block 50 may be quickly raised and the pipe removed.

28 designates a support-tie-piece which is provided with two threaded holes. The vertical cylinder supports 25 and 26 pass through to the hammer-block frame and through enlarged rectangular portions 76ᴬ and 77ᴬ of the main tie-rods 76 and 77 into the threaded holes in the support-tie-piece 28 thus securely holding these parts together. This tie-piece 28 thus forms a double-nut for the vertical supports and at the same time materially strengthens the hammer-block frame. The yoke 27 is arranged to fit over the upper ends of the vertical cylinder supports 25 and 26 and to be fastened thereto by means of nuts 25ᴬ and 26ᴬ.

60 designates a horizontal tie-rod which is arranged to pass through portions of the hammer-block frame 21. This rod is attached to the hammer-block frame by means of nuts 61, 62, 63 and 64 and thereby prevents the hammer-block frame from spreading under heavy strains. A similar tie-rod 65 is provided at the other side of the hammer-block head and is similarly attached by means of nuts, one of which, 66, appears in Fig. 1.

70 designates an engine-bed. 71, 71 designate foundation-bolts for this engine-bed which pass through the longitudinal and transverse beams of the foundation 10. 72, 72 designate similar foundation-bolts which also pass through the engine-bed-plate 70 into the foundation. These two foundation-bolts also pass through the tie-bars 73, 73. In Fig. 8 these tie-bars are shown somewhat in detail and the manner in which the hammer-block foundation-bolts 29ᴬ and the engine-bed-plate foundation-bolts 72 pass through the ends of these tie-bars. This construction is used for the purpose of securely tying the engine-bed-plate and the parts which it supports to the hammer-block frame.

74, 74 designate a number of pedestals which are securely attached to the engine-bed-plate 70. The upper ends of these pedestals are arranged to fit over the main tie-bars 76 and 77 in a manner shown at 75 in Fig. 2, and to support the weight of the engine and its connected parts.

80 designates a yoke which is provided with openings arranged to fit over the main tie-rods 76 and 77. This yoke is arranged to support and to guide the piston rod 98 and to hold a hammer-buffer-cushion 81 which is shown in Fig. 2 and which is also shown more in detail in Fig. 9. This hammer-buffer-cushion comprises a bushing 82 which may be babbitted as shown at 83 to fit the piston rod. It also comprises a striking-plate 84 and a series of spacing-plates 85, 85 between which are secured buffer-plates 86, 86 of vulcanized rubber or other suitable resilient material. This series of plates may be secured together by means of bolts 87, 87 which pass through these plates and through the bushing 82, and which may be provided with holding-nuts 88, 88. The inner diameter of the spacing-plates 85 and buffer-rings 86 is somewhat larger than that of the piston rod 98 so that they do not come in contact with the piston rod even when heated. The yoke 80 is preferably made up in two halves secured together by the bolts 89, 89. This construction facilitates the removal of the yoke for such purposes as renewals or repairs.

90 designates a casting which is arranged to form a yoke which passes over and is supported by the main tie-rods 76 and 77 as is shown in Figs. 2 and 4. The central portion of this casting also forms a steam-cylinder 91. 92 designates the front head of this steam-cylinder and 93 a stuffing-box of usual construction. 94 designates the back head of this steam-cylinder and 95 its stuffing-box. These two heads are held together by means of tie-bolts 96, 96.

97 designates a piston which is arranged to reciprocate within the cylinder 91.

In Fig. 3 I have shown the method which I employ for securing the piston 97 to the piston rod 98. A portion 98$^A$ of the piston rod is threaded as shown and the piston is also provided with threads so that it may be screwed onto this portion of the piston rod and against the shoulder 98$^B$. A key 97$^A$ is then inserted between the piston and the piston rod so that the former cannot work loose. The piston rod is of a large diameter and is arranged to extend through the babbitted portion 83 of the yoke 80 and to support at its outer end a hammer-head 100 of special construction which I will fully describe hereinafter.

Figure 7:
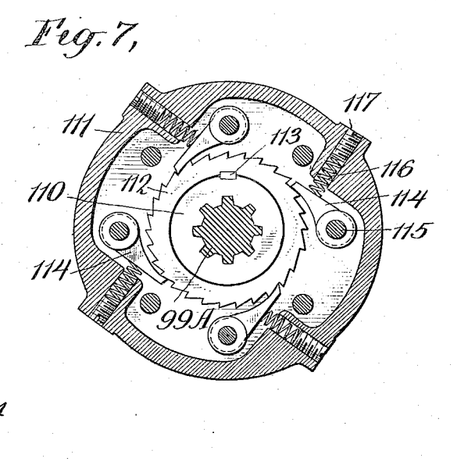
Fig. 7 is a sectional end elevation showing a detail of a ratchet mechanism which I use in carrying out my invention, the section being taken through the line C—C of Fig. 2.

99 designates a reciprocating tail-rod which is securely attached to the piston rod 98 or made an integral part thereof so that it reciprocates with the latter. The end of this reciprocating-rod 99 is provided, as shown in Fig. 2, with spirally turned grooves 99$^A$ which are arranged to fit into a nut 110. The spirally turned grooved portion 99$^A$ of the reciprocating-rod 99 and the nut 110, which is arranged to coöperate with the spiral grooves of the rod, form a portion of a rotating gear. This gear is supported by a bracket 111 which is supported by the main tie-rods 76 and 77 and which is securely attached thereto by the nuts 76$^B$ and 77$^B$. The nut 110 is rotatably mounted in this bracket 111. These parts are shown in detail in Fig. 7. In this view it may be seen that a ratchet-wheel 112 is attached to the nut 110 and is keyed thereto as shown at 113. A series of pawls 114, 114 are pivoted as at 115 to a portion of the bracket 111 and are pressed against the ratchet-wheel 112 by means of springs 116, the pressure of which may be regulated by means of screws 117. A housing 118 may be attached to the bracket 111 and arranged to cover this rotating mechanism and the end of the reciprocating rod 99. The operation of this portion of the apparatus is as follows: When the engine is operated the rod 99 is reciprocated through nut 110. The spiral grooves 99$^A$ cause this nut and its attached ratchet-wheel to be turned slightly when the reciprocating-rod runs through the nut in one direction. This is preferably arranged to take place on the forward stroke of the piston 97. These parts have a tendency to rotate in the opposite direction when the reciprocating-rod is pushed back by the movement of the engine, but in this case the pawls 114, engaging with the ratchet-wheel 112, prevent the nut from turning and this causes the reciprocating-rod itself and its connected parts to turn a part of a revolution during their backward movement. In this manner the piston rod and hammer-head are rotated during the back stroke of the engine-piston but they do not turn during the forward stroke of the engine.

120 designates a pipe connecting the cylinder of the steam-engine with a suitable source of pressure supply. This is connected directly to a steam-chest 121 and into ports of the engine which may be arranged according to any of the well known methods. The exhaust-pipe 121$^A$ is shown on the opposite side of the cylinder.

122 designates a throttle-valve which may be controlled by a manually operated lever 123 for the purpose of controlling the steam supply to the engine.

124 designates a trip-lever which is pivoted at 125 to the yoke 80, and which is connected by a connecting-rod 126 to the engine ports.

127 designates a regulating lever by means of which the operative position of the trip-lever 124 may be adjusted for the purpose of regulating the piston stroke of the engine.

I have not shown the arrangement of the valves specifically as these form no part of my invention and as they are well known in the art.

Figures 10, 11, 12, 13, 14:
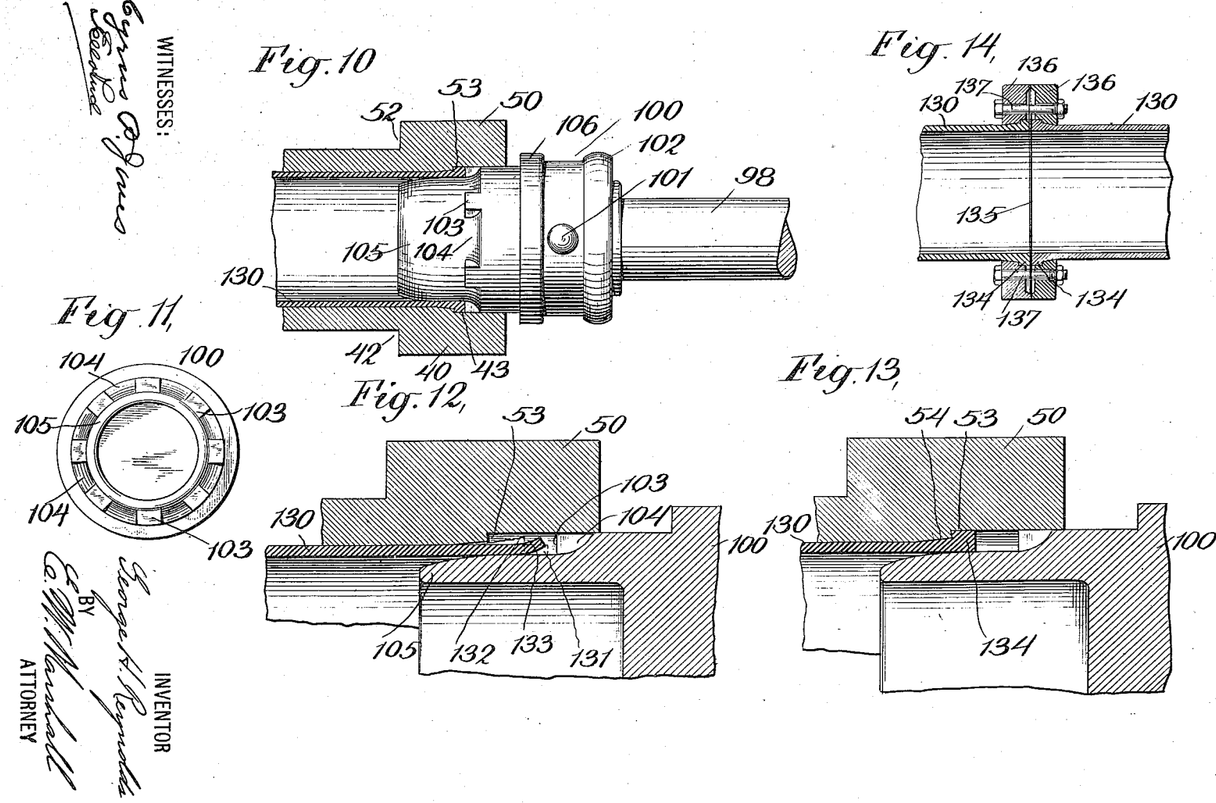
Fig. 10 is a side elevation of one form of hammer-head. This view shows the hammer in operative position between two dies and against the end of a pipe, the latter parts being shown in section.
Fig. 11 is an end elevation of the hammer-head showing its interrupted surfaces.
Fig. 12 is an enlarged sectional elevation of portions of the hammer-head, one of the dies and a pipe, illustrating the process of upsetting the end of a pipe.
Fig. 13 is a similar sectional elevation of the same parts showing the end of the pipe in finished condition.
Fig. 14 illustrates a pipe-joint which I have invented and which comprises two pipes, the ends of which have been upset and enlarged by the apparatus herein shown and described. This form of pipe-joint has been made the subject-matter of another application for patent filed by me October 8th, 1905, Serial No. 338,020.

The hammer-head 100 is shown somewhat in detail in Figs. 10 and 11. It is arranged to be secured to the end of the piston rod 98 by means of a pin 101. The back of the hammer-head is provided with a collar 102 which is arranged to coact with the tripping-lever 124 of the engine, the position of which may be regulated by means of the manually operated lever 127. By this arrangement the length of the piston stroke and force of the blow may be regulated in a well known manner. This hammer-head 100 comprises a series of interrupted contact surfaces 103, 103 between which curved surfaces 104, 104 are provided. In front of these contact surfaces and curved surfaces a projecting portion 105 is provided which is designed to run inside of the pipe and is of substantially the same diameter as the inner diameter of the pipe which is to be upset. The hammer-head is also provided with a shoulder 106 which is so placed in relation to the other parts of the hammer-head that it will strike against the faces of the dies 40 and 50 before the contact surfaces 103 reach the shoulders such as 43 and 53 within the dies.

When this machine is used for the purpose of upsetting the end of a pipe, the pipe is first heated and is then clamped between the holding and forming dies in the hammer-block by means of the hydraulic cylinder 30 and its connected parts in the manner already described. The outer dimensions of the die-blocks are somewhat smaller than those of the frame 22 of the hammer-block which is arranged to hold them. This is for the purpose of allowing for an expansion of the dies due to the heat of the pipe which is clamped between them, a clearance being provided for the purpose of preventing undue strains from this cause upon the hammer-block. The circular lug 41 which fits into the recess 24 of the hammer-block frame serves the purpose already pointed out of holding the die-blocks against longitudinal movement and also serves to hold them in alinement with the engine-piston 98 and other parts of the machine regardless of the expansion of the dies or hammer-block.

The engine is operated in a well known manner so that the hammer-head is reciprocated thereby to deliver a succession of blows upon the end of the pipe 130. It is also slightly rotated between its strokes in the manner previously described.

Referring now to Fig. 12 I will point out the process of upsetting a pipe by means of the parts already described. In this figure a portion of the pipe 130 is shown in operative relation to a portion of the die-block 50. Here the dotted lines, as at 131, indicate the shape of the end of the pipe when it is first placed between the die-blocks. After the hammer-head 100 has been driven against the end of this pipe by the steam-engine so that it has delivered a blow against the end of the pipe, the portions of the pipe which have been struck by the flat contact surfaces 103 will assume the shape indicated at 132. At the same time the curved surfaces 104, which are between the interrupted contact surfaces 103, will act upon intermediate parts of the pipe and bend them outwardly into the shape indicated at 133. The forward part 105 of the hammer which has been, during this operation, thrust within the center of the pipe, will prevent the pipe from collapsing and from buckling inward or from changing its internal size or shape. The next blow of the hammer-head upon the end of the pipe will take place after the hammer-head has been slightly rotated so that the contact surfaces 103 will then strike against the portions which have been previously bent outwardly as at 133 by the curved surfaces 104. The repetition of this operation will gradually cause the end of the pipe 130 to be hammered down into the dies until it has been enlarged into a flange of the form shown at 134 and completely fills the space surrounding the shoulders such as 53 and the inclined surfaces such as 54 which are preferably at right angles to each other. The upper die may then be raised and the pipe removed.

In Fig. 14 I have shown a pipe-joint made up of two pipes 130, 130, the ends of which have been upset and enlarged to form flanges 134, 134 in the manner just described. The faces of these flanges may be finished off by tooling. Any kind of suitable packing 135 may be placed between the adjacent flanges if desired, but it has been found that a tight joint can be formed by this construction without any packing whatever. The two parts may then be securely held together by means of clamping collars 136, 136 which are securely held together by means of a series of bolts 137. Such a joint is easily and economically made and is capable of withstanding great pressure.

Figures 15, 16, 17, 18:
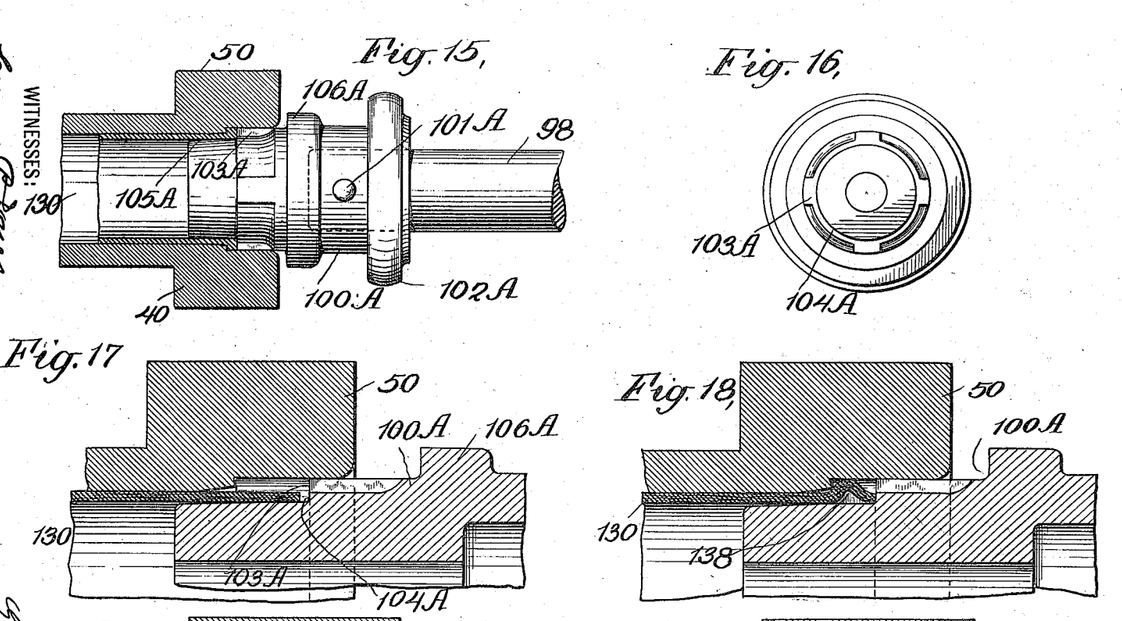
Fig. 15 is a side elevation of a modified form of hammer-head, in conjunction with a pipe and its holding and forming dies shown in section.
Fig. 16 is an end view of the hammer-head shown in Fig. 15.
Figs. 17, 18, 19 and 20 are enlarged sectional elevations of a portion of this modified hammer-head, one of the dies and the end of a pipe, the pipe being shown in these different figures in different steps of its development under the action of the hammer.
Figure 19:
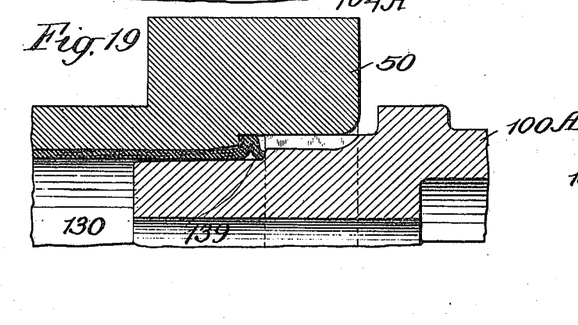
Figure 20:
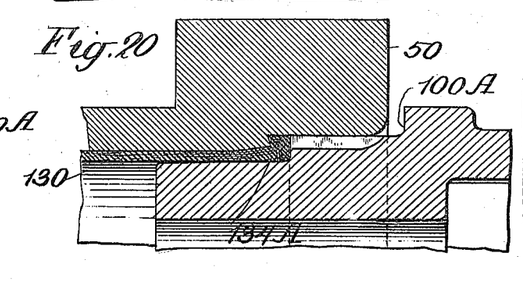

In the modified form of hammer-head shown in Figs. 15 and 16, $100^A$ designates the hammer-head which may be attached to the piston rod 98 by means of a pin $101^A$ and which may be provided with collars $102^A$ and $106^A$ similar to those already described. In this case the hammer-head is provided with interrupted contact surfaces $103^A$ between which is a continuous contact surface $104^A$ in the same plane with the interrupted contact surfaces $103^A$. The forward part $105^A$ of this hammer is formed in the manner previously described in conjunction with the other hammer-head to fit inside the pipe 130. The die-blocks 40 and 50 are similar to those already described. The operation of this form of hammer is somewhat different from that previously described and I will now point out its operation referring to Figs. 17, 18, 19 and 20. In Fig. 17 the end of a pipe 130 is shown in operative relation to one of the die-blocks 50. When the hammer-head $100^A$ is moved to deliver a blow against the end of this pipe 130, it may be seen that the continuous contact surface $104^A$ is the one which first comes in contact with the end of the pipe. This is clearly shown in Fig. 18. It has been found in practice that the effect of this first blow is always to buckle the end of the pipe 130 into the form indicated at 138 in this figure. The next blow of the hammer will take place after the latter has been rotated slightly in a manner already described and will cause the buckled portion of the pipe to be flattened down against itself in the form shown at 139 in Fig. 19. The repetition of this operation will gradually cause the end of the pipe to assume the form of a flange 134ᴬ of the same shape and size as that of the flange 134. This operation takes place while the metal is hot and the metal itself is thoroughly welded together, but in this case the grain or fiber of the metal of the pipe will assume the directions shown at 134ᴬ in this Fig. 20. I find in some cases that this is a preferable method of upsetting a flange upon the end of a pipe. The width of the flange so formed is dependent only upon the internal diameter of the die-block and the length of the pipe projecting through the dies to be operated upon the hammer-head.

I have illustrated two forms of hammer-heads to show that my invention is not limited to any specific form.

While I have illustrated my invention as applied to upsetting flanges upon the ends of malleable pipes I have done so only because this is one of its most advantageous uses. My invention, however, is applicable to many other uses as malleable metal of many shapes, sizes and forms may be upset or enlarged by using various forms of die-blocks and hammer-heads. The constructions of the various parts which I have shown to illustrate my invention are, however, preferred forms. A machine of this kind, especially when used for upsetting large pipes or for other heavy work, is subjected to unusual strains, and, in order to provide an apparatus which will stand up under such strains without being materially affected thereby, I have designed the various parts as shown. The foundation is of heavy construction and is especially designed to withstand longitudinal strains and shocks without deranging the alinement of the parts. The hammer-block is of liberal dimensions and is reinforced by the tie-piece 28, by the horizontal tie-rods 60 and 65 and by the vertical rods which support the hydraulic cylinder and by the channel-irons which form a part of a foundation. The hydraulic cylinder as constructed is capable of withstanding considerable strains and will not be easily affected by its piston striking against its upper or lower heads as such strains will be taken up by the series of tie-bolts 37 and not by the cylinder itself. The parts comprising the steam engine are also heavily built and the heads of the engine cylinder are similarly held together by means of tie-bolts 96.

The construction of parts which I have illustrated and described for tying the hammer-block and the various parts of the engine mechanism together and which include the tie-rods 76 and 77, is common in a machine of this class. It may be seen that the vertical cylinder supports of the hammer-block pass directly through enlarged portions of these main tie-rods and that all parts of the engine mechanism are supported between and by these tie-rods. The tie-rods themselves and the various parts which they support are so proportioned and arranged as to form a continuous and rigid arrangement of the parts which is capable of withstanding heavy longitudinal strains and shocks. The arrangement of some of the foundation-bolts and the tie-bars 73, 73 further strengthen the apparatus against longitudinal strains.

While the particular construction of the hammer-head is important in the employment of a machine of the character herein described, it is evident that the details of said head may be modified without impairing the usefulness and advantageous features of the general construction of the machine, and I do not, therefore, confine myself to the preferred form of hammer-head which is herein specially described.

The various parts of the machine may be reasonably modified to allow for different sizes of machines or otherwise as may be found desirable in designing machines for treating various sizes of pipes so long as said machines embody the features of my invention which are recited in the claims.

What I claim is,—

1. In an upsetting machine, a rotatable reciprocatory hammer-head having a projecting portion, and interrupted striking surfaces annularly disposed about said projecting portion.

2. In an upsetting machine, a rotatable reciprocatory hammer-head having a projecting portion, striking surfaces annularly disposed about said projecting portion, and obliquely disposed contact surfaces between the striking surfaces.

3. In an upsetting machine, a rotatable reciprocatory hammer-head having a projecting portion, a plurality of flat striking surfaces annularly disposed about said projecting portion and at right-angles to its axis, and curved operative surfaces between said striking surfaces.

4. In an upsetting machine, a rotatable reciprocatory hammer-head having one or more annularly disposed striking surfaces at right-angles to its axis, and one or more contact surfaces oblique to the axis of the hammer-head.

5. In an upsetting machine, a forming-die adapted to hold the end of a pipe, a rotatable reciprocatory hammer-head having one or more annularly disposed striking surfaces at right-angles to its axis, and one or more contact surfaces oblique to the axis of the hammer-head.

6. In an upsetting machine, a forming-die adapted to hold the end of a pipe, a reciprocatory hammer-head having one or more annularly disposed striking surfaces at right-angles to its axis, one or more contact surfaces oblique to the axis of the hammer-head, and means for relatively rotating the hammer-head and the die.

7. In an upsetting machine, a forming-die adapted to hold the end of a pipe, a reciprocatory hammer-head having a projecting portion arranged to fit inside of the portion of pipe within said die and interrupted striking surfaces annularly disposed about said projecting portion, and means for relatively rotating the hammer-head and the die.

8. In an upsetting machine, a forming die adapted to hold the end of a pipe, a rotatable reciprocatory hammer-head having a projecting portion arranged to fit inside of the portion of pipe within said die, and interrupted striking surfaces annularly disposed about said projecting portion.

9. In an upsetting machine, a forming-die adapted to hold the end of a pipe, a rotatable reciprocatory hammer-head having a projecting portion arranged to fit inside of the portion of pipe within said die, a series of interrupted striking surfaces annularly disposed about said projecting portion and at right-angles to its axis, one or more contact surfaces oblique to the axis of the hammer-head, and means for relatively rotating the hammer-head and the die.

10. In an upsetting machine, a pair of clamping and forming-dies, means for holding the dies together, and a rotatable hammer-head having a projecting portion arranged to fit inside of a pipe within said dies and a series of striking surfaces annularly disposed about the projecting portion, and operative contact surfaces between the striking surfaces.

11. In an upsetting machine, a pair of clamping and forming-dies, a hydraulic cylinder arranged to open and close, and hold said dies together under pressure, a rotatable reciprocatory hammer-head having a projecting portion arranged to pass freely through said dies when the latter are together and to fit inside of a pipe within said dies, a series of flat striking surfaces annularly disposed about the projecting portion and at right-angles to its axis, and a series of curved operative contact surfaces between said striking surfaces.

12. In an upsetting machine, a pair of forming dies arranged to hold a pipe, a rotatable reciprocatory hammer-head, said hammer-head being provided with a projecting portion arranged to fit into the pipe between said dies, a plurality of interrupted flat striking surfaces annularly disposed about the projecting portion and at right-angles to its axis, and a series of contact surfaces oblique to the axis of the hammer-head between said striking surfaces, said dies and hammer-head being arranged to form a flange on the end of the pipe.

13. In an upsetting machine, a hammer-block, an engine, a hammer carried by the piston of said engine and arranged to be reciprocated thereby, toward and from the hammer-block, a pair of tie-rods passing through the hammer-block and supporting the engine, and rods passing through the hammer-block and through the tie-rods.

14. In an upsetting machine, a hammer-block arranged to hold a pair of forming-dies, a hydraulic clamping device arranged to hold said dies together under pressure, a pair of horizontal tie-rods passing through the hammer-block, a horizontal engine mounted upon said tie-rods, a hammer carried by the piston thereof, and vertical rods arranged to support the clamping device, said vertical rods passing through the hammer-block and through the horizontal tie-rods.

15. In an upsetting machine, a hammer-block, a horizontal engine, a hammer carried by the piston thereof, a guiding-yoke for said hammer, a pair of horizontal tie-rods, vertical rods passing through the hammer-block and through the tie-rods, said tie-rods supporting the engine and arranged to connect the hammer-block, the yoke, and the engine together.

16. In an upsetting machine, a hammer-block, a horizontal engine, a hammer carried by the piston thereof, a guiding-yoke for said hammer, a hammer-buffer-cushion in said yoke, and a pair of tie-rods connecting the hammer-block, the engine, and the yoke together.

17. In an upsetting machine, an engine, a hammer carried by the piston thereof, a guiding-yoke for the hammer, a hammer-buffer-cushion supported by the yoke, said cushion comprising a plurality of resilient rings and a series of metallic spacing rings, and a pair of tie-rods connecting the hammer-block, the yoke, and the engine together.

18. In an upsetting machine, a hammer-block, longitudinal tie-rods secured to the hammer-block, supports for the free ends of the tie-rods, an engine wholly supported by the tie-rods and held thereon against longitudinal movement, clamping and forming-dies carried by the hammer-block, and a reciprocatory hammer-head guided in the forming-dies and operated by the engine.

19. In an upsetting machine, dies for holding and forming the end of a pipe, a hammer-head coöperating with said dies for forming the pipe end and having annularly arranged interrupted striking surfaces, means for reciprocating the hammer-head, and means for producing a relative rotation between the dies and the hammer-head.

20. In an upsetting machine, dies for holding and forming the end of a pipe, a hammer-head having interrupted striking surfaces arranged to act upon the pipe end within the dies for upsetting the same, means for reciprocating the hammer-head, and devices for intermittently rotating the hammer-head whereby the upsetting of a pipe end is accomplished by successive upsetting acts which take place in rotation about the pipe.

21. In an upsetting machine, dies for holding and forming a pipe end combined with a reciprocatory hammer-head adapted to strike at any one blow a portion only of the end of the pipe, and means for causing an intermittent relative rotary movement between the dies and the hammer-head.

22. In an upsetting machine, dies for holding and forming a pipe end combined with a reciprocatory hammer-head having interrupted flat striking surfaces and operative curved contact surfaces between the striking surfaces, said striking surfaces arranged to act upon portions only of the pipe end within the dies at any one blow for upsetting the same, said curved contact surfaces arranged to act at the same time upon intermediate portions of the pipe end to bend said portions, and means for causing an intermittent relative rotary movement between the dies and the hammer-head.

23. In an upsetting machine, a hammer-block, longitudinal tie-rods secured to the hammer-block, supports for the free ends of the tie-rods, an engine wholly supported by the tie-rods and held thereon against longitudinal movement, clamping and forming-dies carried by the hammer-block, power devices for operating the clamping and forming-dies, transverse rods supporting said operating devices and passing through the hammer-block and through the longitudinal tie-rods, and a reciprocatory hammer-head guided in the forming-dies and operated by the engine.

24. In an upsetting machine, a hammer-block arranged to hold a pair of clamping and forming-dies, a pair of horizontal tie-rods secured to the hammer-block, supports for the free ends of the tie-rods, an engine wholly supported by the tie-rods and held thereon against longitudinal movement, a hammer carried by the piston of said engine, a guiding-yoke for said hammer, a hammer-buffer-cushion in said yoke, a hydraulic power device for operating the clamping and forming-dies, vertical rods supporting said hydraulic operating device and passing through the hammer-block and through the horizontal tie-rods, said tie-rods being arranged to connect the hammer-block, the yoke, and the engine together, and means for relatively rotating the hammer and the dies.

In testimony whereof I have signed my name to this specification in the presence of two subscribing witnesses.

GEORGE H. REYNOLDS.

Witnesses:
ELLA TUCH,
ERNEST W. MARSHALL.